Figure 1:
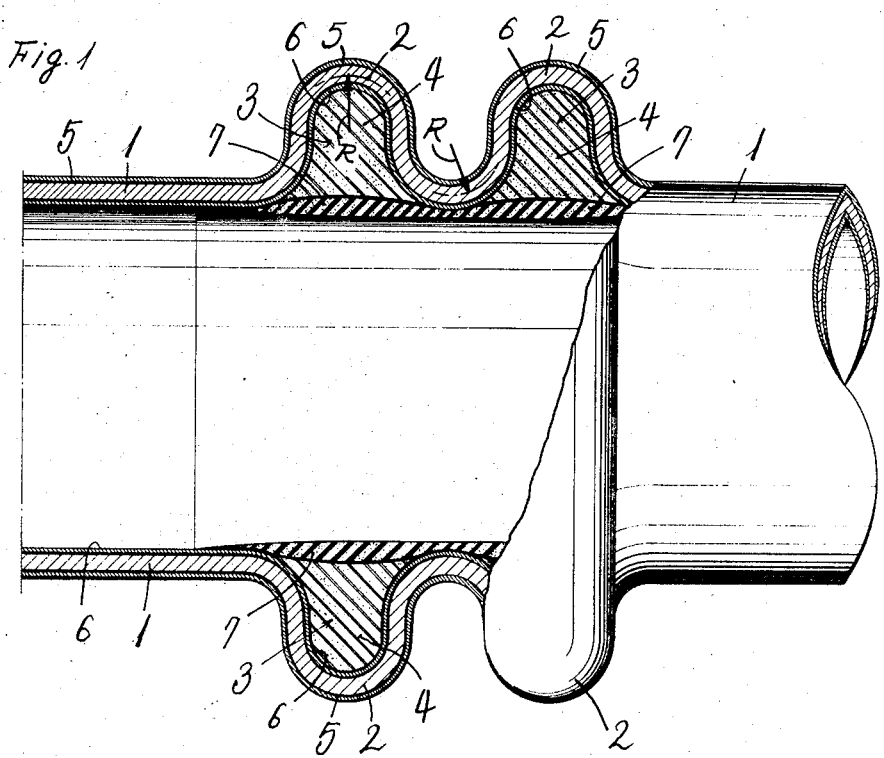

United States Patent

[11] 3,550,639

| [72] | Inventor | Takeo Okuda<br>1250 Konoike Higashiosaka-shi, Osaka, Japan |
|---|---|---|
| [21] | Appl. No. | 739,748 |
| [22] | Filed | June 25, 1968 |
| [45] | Patented | Dec. 29, 1970 |
| [32] | Priority | July 18, 1967 |
| [33] | | Japan |
| [31] | | No. 42/46207 |

[54] BUFFER PIPE
6 Claims, 5 Drawing Figs.

[52] U.S. Cl. .................................................. 138/121,
138/109; 61/72.4
[51] Int. Cl. .................................................. F16l 11/14
[50] Field of Search ......................................... 138/172,
173, 177, 178, 121, 122, 174;
137/236; 61/16, 72.4; 285/126, 129

[56] References Cited
UNITED STATES PATENTS

| 868,524 | 10/1907 | Bayer | 138/173 |
| 1,806,920 | 5/1931 | See | 138/173 |

*Primary Examiner*—Laverne D. Geiger
*Assistant Examiner*—Richard J. Sher
*Attorney*—Wenderoth, Lind & Ponack ABSTRACT: A buffer pipe for placing between metal pipes buried in the ground to absorb stresses. The buffer pipe has ring-shaped bulges or corrugations integrally formed in the pipe body and extending outwardly from the outside circumference of the pipe. The spaces within the bulges are filled with fluid-impermeable sponge rubber which fills the spaces to a point substantially level with the inside circumference wall of the pipe body.

PATENTED DEC 29 1970 3,550,639

SHEET 1 OF 2

TAKEO OKUDA,
INVENTOR

BY Wendeworth, Lind & Ponack,
ATTORNEYS

PATENTED DEC29 1970 3,550,639
SHEET 2 OF 2
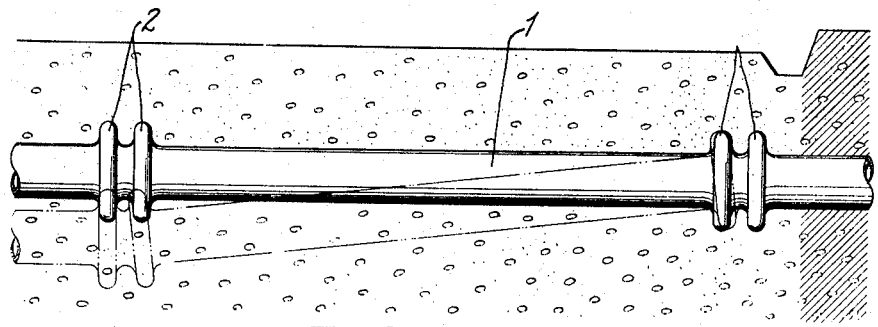
Fig. 3
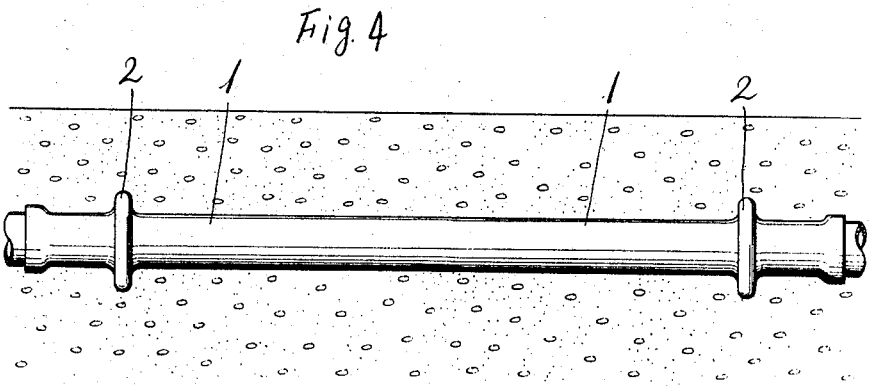
Fig. 4
Fig. 5
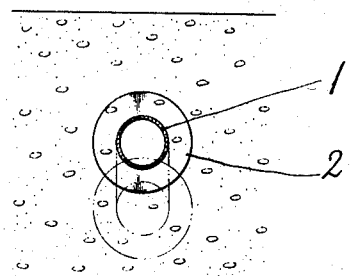
TAKEO OKUDA,
INVENTOR
BY Wenderoth, Lind & Ponack,
ATTORNEYS

BUFFER PIPE

This invention relates to a buffer pipe used for steel pipelines to be buried underground for the object of city water supply, industrial water supply, or conveyance of sea water, sewage and liquid materials, etc.

Steel pipes buried underground for the purpose of conveyance of fluid are liable to be subjected to stresses generated in the body of each pipe which give rise to defaults such as breaking, leaks, etc. which conditions may emanate from such causes as uneven settling of the ground, changes in earth pressure of the bearing stratum of the pipeline, variations in temperature, etc. Many methods are adopted as countermeasure against such faults as above mentioned, including the use of pipe joints for pipe connections with interposition of packings, etc. However, inasmuch as almost all of such methods involve the use of pipe joints, it is necessary to bind the pipe joints by suitable bolt connection or welding so as to increase strength of the joints, or to improve watertightness at the joints. These prior art forms require much labor, and accordingly not only result in a considerable increase in construction cost but also give rise to many points of question, such as subsequent natural slackening of bolted connections, problems attached to welded joints, or the questions related to painting of the joint portions, etc. Particularly when the underground steel pipe is to be connected with a rigid body such as concrete structure (such as a dam, building, pipeline bridge, etc.), the uneven settling of the ground in the location of the pipe connection to the rigid body, variations in temperature and moving of pipeline caused by an earthquake, etc. will be serious, and the stresses generated in the pipe body will proportionally be great, which points must be given full consideration.

The objectives of this invention lie in that when the steel pipes buried underground have a tendency to be moved or dislocated owing to the various reasons such as uneven settling of the ground, changes in earth pressure, variations in temperature and earthquake, etc., by using my improved buffer pipe, the pipe is capable of freely adapting itself to any distortions which may result from such causes as above, the pipe is provided in such a manner that all the stresses generated in the pipe body is buffered so as to prevent local breaking of the pipe wall, or leaking, thereby elevating safety and durability of the pipe, and allowing the pipeline facilities to be constructed at low costs.

Another objective of this invention is to eliminate the use of pipe joints, packings, and other interposed piping materials, so that the possibilities of leaks which start as the result of possible separations by the slipping out or dropping off of the pipe in its axial directions are substantially eliminated or reduced.

Still another objective of this invention is to fill up the corrugations or any depressions formed inside the pipe body so as to prevent the deposits of precipitates in the said depressions, and to thereby smoothen the conveyance of the fluid to avoid turbulence in the flow of fluid through the pipe, and also to be free from the effects of distortion of the pipe body.

According to this invention, the objectives above-mentioned can be achieved by forming one or two circumferential plaited bulgings or corrugations in the required locations of the pipe by such methods as to cause the pipe to circumferentially be plaited. The said one or two bulgings shall be formed at both ends of the pipe length. The depressions which will be formed by the said plaited bulgings may be filled up by such an elastic filling material as water-impermeable synthetic rubber sponge so as to be substantially flush with the inside wall surface of the pipe.

Novel features of construction and operation of the device will be more clearly apparent during the course of the following description, reference being had to the accompanying drawings wherein has been illustrated the preferred embodiment of the device and wherein like characters of reference are employed to denote like parts through the several FIGS.

Figure 2:
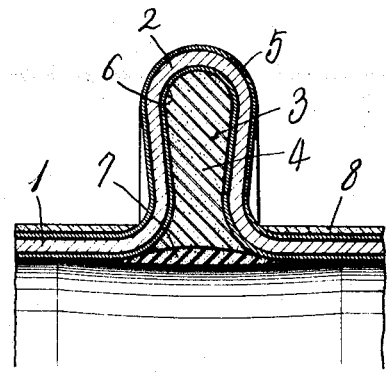

In the drawings FIG. 1 is an enlarged side view of the longitudinal section of the essential plaited end portion of the buffer pipe. FIG. 2 is also an enlarged side view of the longitudinal section of the essential plaited end portion of the buffer pipe, which represents another embodiment of this invention. FIGS. 3 and 4 are side views of the buffer pipe in a condition as buried underground, and FIG. 5 is an end elevation of the said buffer pipe.

By forming a plait or plaits in the pipe body itself in such a manner that the said plaits will bulge in the direction of outside circumference of the pipe body 1, a single or two successive bulgings 2 are shaped in the required locations of the pipe body (at least at the points close to both ends) without any circumferential seams as an integral part thereof, and that the depressions 3 of the said bulgings 2, are filled with the filler material 4 of elastic water-impermeable synthetic rubber sponge so as to be about flush with the inside surface of the pipe body.

The bulgings 2 are formed in the following manner. Inside the pipe body 1, the required internal pressure is preliminarily maintained by means of applying hydraulic pressure, etc. and with exception of the portions to be shaped as bulgings, the outside circumferential surface of the pipe body 1 is maintained so that such portions will not expand or shrink in the direction radial to the pipe diameter. Then from both ends of the pipe body 1, powerful compressive force is applied in the direction longitudinal to the pipe length. By this method, plaits or corrugations will be shaped without any circumferential seams in the said specific portions of the pipe body 1, and the plaited bulgings 2 of approximately the same wall thickness as that of the pipe body 1 will be shaped in the said portion. It is understood that the pipe wall thickness then will also be substantially the same as that of the corresponding pipe sections with which it is being interjoined. By adequately regulating the compressive force and internal pressure, it will optionally be feasible to form a relatively low bulging having a large radius R as shown in FIG. 1 or a tall and bulging corrugation with its root reduced as shown in FIG. 2.

On both of the inside and outside circumferential surfaces of the pipe body 1 and on those of the plaited bulgings 2 continuing thereto, a coating such as tar epoxy-resin, etc. is applied to form the coated films 5 and 6.

The filling material 4 of water-impermeable synthetic rubber sponge is composed of a ring of the identical section with the depression 3 inside the bulging 2, and is inserted and fitted into the depression 3 from the inside surface of the pipe body so as to be integrated with the pipe body by adhesion after the said inside surface coating has been applied. After insertion of the filling material 4, in order to smoothen the inside circumferential surface of the pipe body 1 to eliminate unevenesses, neoplene rubber lining 7 is applied on the inside surface of the said portions.

In FIG. 2 8 denotes the coated layer of coal tar enamel with glass fibre mixed, which is applied on the outside circumference except the plaited bulgings 2 of the pipe body 1.

When a tensile strength or compressive load is applied in the longitudinal direction of the pipe body 1 or a load is imparted in a bending direction, various stresses will most strongly work to the peak and trough portions of the plaited bulgings 2. However, since the said peak and trough portions are integrated with the pipe body in a continuous and uniform wall thickness without forming any seam, these portions are maintained flexible so as to be capable of freely stretching and shrinking, while all the tensile, compressive and bending stresses are buffered by the plaited bulgings 2, and no adverse burden will be imposed on other portions 1 of the pipe body 1 in respect of strength of the material. Accordingly, in FIGS. 3-—5, even in case any portion of the pipeline buried underground may sink owing to settling of the ground, etc. the plaited bulging alone will be distorted similar to the action of a universal joint in conformity with the deflection angle as indicated in chain line in the said Drawings, and there will be no possibility of a breaking stress being generated locally or in the pipe as a whole. This is an important feature of the invention.

With regard to the internal pressure which is made to act upon the interior of the pipe body 1 when the said plaited bulgings 2 are formed, hydraulic pressure is most effective, and when this hydraulic pressure method is utilized, the dimensional tolerance for the products may be minimized, and can achieve a high degree of true roundness. Besides, as the moment of inertia of the circumferential cross section will become greater, even though external force may be applied there will be the least possibility of distortion to be inflicted, particularly the strength against external pressure will greatly be increased.

As mentioned above, according to the present invention, the pipe body of the steel pipes intended to be buried underground such as those for waterworks, is circumferentially plaited in the required locations so as to form corrugations or bulgings. Therefore, the pipe thus processed has a large margin of strength against stretching and shrinking, as well as for flectural angle, so that the pipe is capable of freely adapting itself to universal axle-like distortion in response to changes in yield strength of the ground, and perfectly buffering all tensilte, compressive, and bending stresses, thereby preventing other local flexing or fracturing of the pipe from occurring. Furthermore, since the parts functioning as buffer against these stresses do not require the use of pipe joints, packings, etc. there will be no possibility of slipping off in the longitudinal direction of the pipe, and the possibility of leaking to be caused by dropping off will also be eliminated. Moreover, the plaited bulgings are formed in the pipe body itself with the identical wall thickness as integrated parts, connection with other buried pipes of cast iron, ductile iron, etc. can be carried out with any special classification of pipes which are manufactured as coated pipes in the same wall thickness. Besides, as there is no circumferential welded line (seams) both in the peak and trough portions of the bulging, which may be subjected to the maximum stress by stretching and shrinking and bending, it will prove to be most advantageous in respect of strength.

Moreover, the said plaited bulgings are formed primarily only in the vicinities of both ends, is simple in its construction with a large and smooth radius R of the bulging portions, the ample effectiveness may be expected with the applied coating, while there will be no fear of the coating to peel off, which may be caused by such distortions.

According to the present invention, the depressions in the inside circumference of pipe body formed by the plaited bulgings are filled up by filler materials such as water-impermeable synthetic rubber sponge, the deposit of precipitates in the said depressions will be prevented, while the turbulence in the flow of fluid which may be caused as it passes through the pipe by reason of the presence of such depressions, can also be avoided. The said filler material of bulging can adapt itself to distortion generated at the bulging in such a manner that the pipe would not be affected by such a distortion, hence smooth conveyance of fluid may be assured all the times.

It is to be understood that the invention is not limited to the precise construction shown, but that changes are contemplated as readily fall within the spirit of the invention as shall be determined by the scope of the subjoined claims.

I claim:

1. A buffer or connecting pipe for interconnecting with at least one other main section of a pipeline of similar cross-sectional size where said pipes are subject to axial disalignment stresses, said buffer pipe comprising:
   a. a predetermined length of pipe having at least one integrally formed, seamless, outwardly projecting annular bulge or corrugation adjacent its opposite ends, and forming annular voids thereat, with a substantial intermediate length of uncorrugated pipe section between said end corrugations;
   b. the annular bulge-formed voids having fluid-impermeable, resilient filler material means disposed therein in substantially flush condition with the inner circumferential surface of the balance of said pipe; and
   c. whereby when connected with other main sections of a pipeline, said end corrugations permit potential axial disalignment without disjoining or fracture of said pipe sections or said buffer pipe, if subjected to axial disalignment inducing stresses.

2. A buffer pipe as defined in claim 1 having a pair of said corrugations juxtaposed at each end thereof.

3. A buffer pipe as defined in claim 1 wherein resilient filler material means includes a main inner spongelike compressible and expansible material, and a fluid-permeable protective lining sealingly overlaying the inner peripheral surface thereof.

4. A buffer pipe as defined in claim 1 wherein the buffer pipe wall is provided with a protective coating both interiorly and exteriorly of the pipe.

5. A buffer pipe as defined in claim 1 wherein the bulges are so shaped that the height of the outwardly projecting corrugation is about two times the width thereof, and the distance between radial wall portions of the annular corrugation is substantially uniform when initially formed.

6. A buffer pipe as defined in claim 1 wherein the bulges are so shaped that the height of the outwardly projecting corrugation is substantially greater than its width, and the distance between opposed radial wall portions of the annular corrugation is lesser at the base near the main pipe section body than near the peak or outer diameter of said corrugation.